April 14, 1970 J. W. ENDRESS 3,506,375
COMPRESSOR SEALING SYSTEM
Filed July 31, 1968 3 Sheets-Sheet 1

FIG. I

INVENTOR.
JAMES W. ENDRESS.
BY
ATTORNEY.

INVENTOR.
JAMES W. ENDRESS.
BY Raymond Curtin
ATTORNEY.

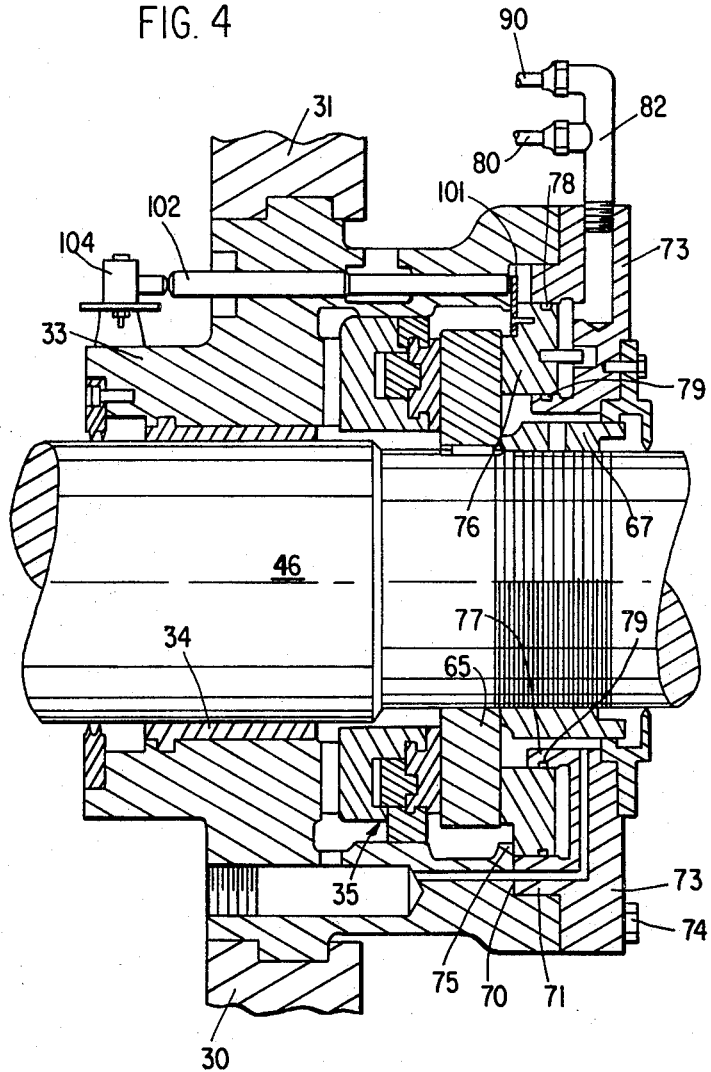

United States Patent Office 3,506,375
Patented Apr. 14, 1970

3,506,375
COMPRESSOR SEALING SYSTEM
James W. Endress, Syracuse, N.Y., assignor to Carrier Corporation, Syracuse, N.Y., a corporation of Delaware
Filed July 31, 1968, Ser. No. 749,119
Int. Cl. F04b *49/02;* F04d *29/00;* F02f *11/00*
U.S. Cl. 417—13        5 Claims

ABSTRACT OF THE DISCLOSURE

A fluid compressor structure is provided with an automatic shut down seal to prevent loss of pressure in the compressor housing. An impeller housing and the bearing housing for the impeller shaft are separated by a partition wall. The partition wall is provided with an annular face seal confronting the compressor housing, and the shaft is formed with a shoulder which, upon counter thrust movement of the shaft, is moved into sealing engagement with the face seal. The usual running seal is provided to inhibit the flow of fluid from the impeller housing into the bearing housing during operation of the machine. During operation of the compressor, a counter thrust bearing is maintained in position to prevent counter thrust movement of the impeller shaft and engagement of the shoulder thereon with the fixed face seal. Subsequent to shut down of the compressor, fluid pressure employed to maintain the counter thrust bearing in the position described is relieved from behind the counter thrust bearing, permitting movement of the counter thrust bearing and accordingly, counter thrust axial movement of the impeller shaft so that the shoulder and the face seal may engage and effectively seal the compressor housing from the bearing housing. Movement of the counter thrust bearing operates a switch in the compressor motor circuit, whereby the same cannot be restarted until the fluid pressure is again established behind the counter thrust bearing.

BACKGROUND OF THE INVENTION

Gas compressors employing impellers are used extensively in refrigerating systems, particularly in large installations wherein the compressor has a rating of thousands of tons. These compressors are provided with running seals enclosed with oil under pressure to seal off the impeller housing during operation of the machine, and such seals function efficiently for that purpose. However, when the compressor is shut down and the oil pressure is lost, the running seal is ineffective to prevent loss of pressure in the impeller housing for any substantial length of time.

Furthermore, in machines of this type, if the running seal becomes defective and has to be replaced, or a bearing becomes defective and has to be replaced, the structure in the bearing housing has to be disassembled, which means that the compressor has to be taken off the line to make such repairs.

SUMMARY OF THE INVENTION

My invention is directed to a compressor structure of the kind described including a shut down seal which functions automatically to seal the compressor housing when the compressor is stopped, the arrangement being such that upon shut down, the bearings for the impeller shaft may be replaced and likewise, the running seal.

An annular face seal is fixedly mounted in a partition wall between the impeller housing and the bearing housing. The shaft is provided with an enlargement, such as a collar, or shoulder. Normally, the thrust occasioned by the impeller maintains the shaft shoulder in spaced relation to the face seal, and a second enlargement on the shaft is running engagement with a thrust bearing. A counter thrust bearing is provided and, during operation of the machine, is positioned by fluid pressure in running clearance with the second enlargement on the impeller shaft. With this arrangement, when the impeller slows down, the counter thrust thereof is taken by the counter thrust bearing, preventing sufficient counter axial movement of the impeller shaft to effect engagement of the shoulder thereon with the face seal. When the impeller has come to rest, the oil pressure bhind th thrust bearing is released, either manually or automatically, and thereupon, the pressure in the impeller housing effects counter axial movement of the shaft sufficient for the shoulder thereon to move into sealing engagement with the face seal.

Preferably, upon release of the fluid pressure from behind the counter thrust bearing and movement thereof by counter thrust of the impeller shaft, a switch is actuated to open the circuit controlling power to the compressor motor and accordingly, the motor cannot be again started until the pressure is reestablished behind the counter thrust bearing actuating piston.

The invention has several features that are particularly advantageous. The shut down seal, as stated, can be manually or automatically operated. As the thrust load is completely removed from both the thrust bearing and the counter thrust bearing during shut down, an oil film is assured on the bearing surfaces when the machine is started up. Due to the fact that the thrust load during operation of the compressor is always on the main thrust bearing, there is no running engagement between the shaft seal shoulder and the face seal.

All components of the impeller shaft bearings and running seal can be removed and serviced while the machine is under pressure. In the arrangement to be described, the counter thrust bearing is free of refrigerant atmosphere and supplied with only clean filtered oil.

BRIEF DESCRIPTION OF THE DRAWINGS

FIGURE 4 is an enlarged view of a portion of FIGURE 1 illustrating the counter thrust bearing employed with my invention.

DESCRIPTION OF THE PREFERRED EMBODIMENT

Figure 1:
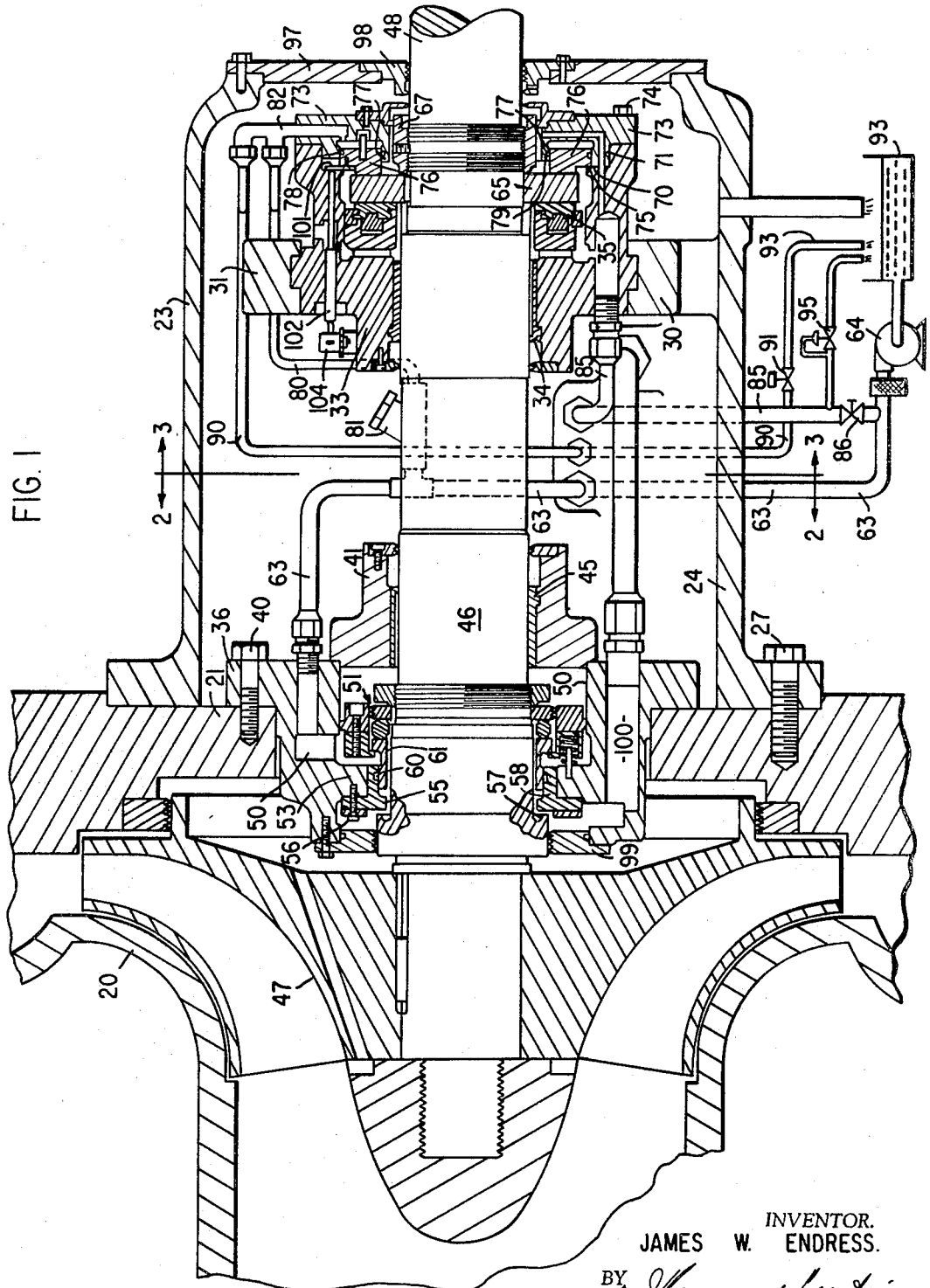
FIGURE 1 is a lengthwise sectional view of a compressor structure embodying my invention.
Figure 2:
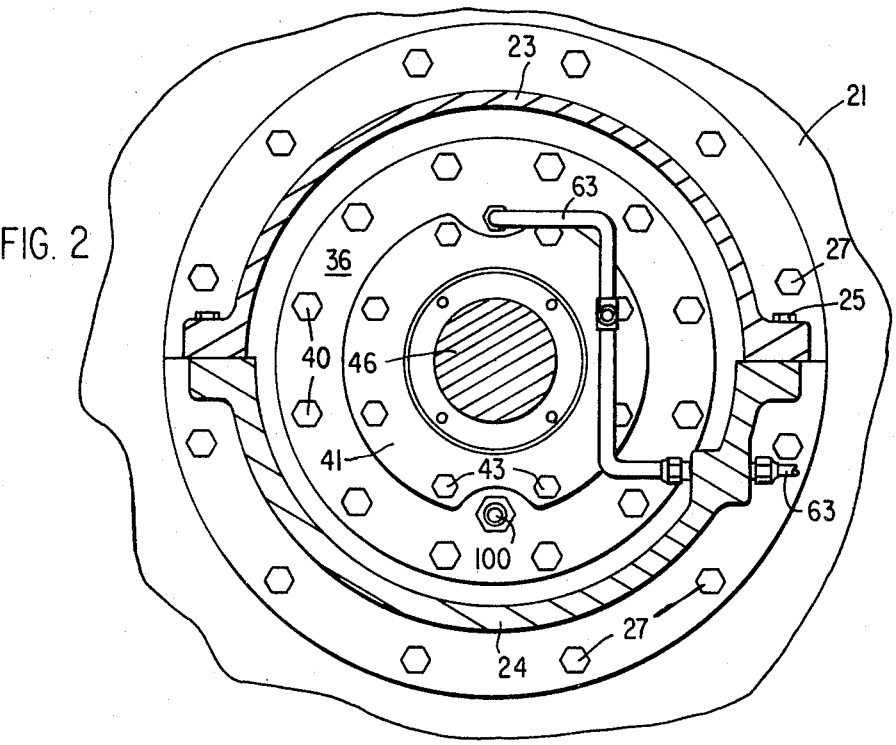
FIGURE 2 is a view taken on line 2—2, FIGURE 1.
Figure 3:
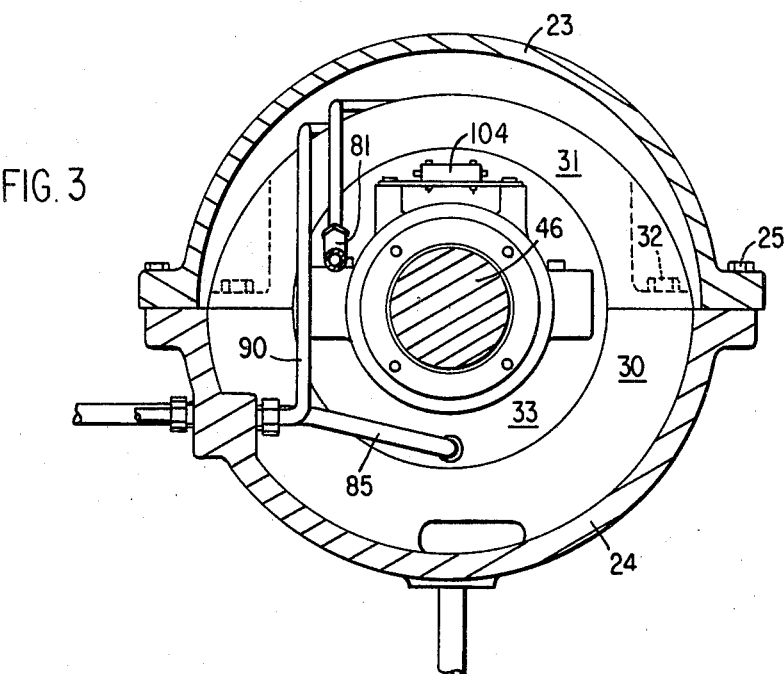
FIGURE 3 is a view taken on line 3—3, FIGURE 1.

Referring to FIGURE 1, a portion of the compressor housing is indicated at 20. The housing is closed at one end by a partition wall 21 to which the bearing housing is attached. The bearing housing is formed by a pair of semi-cylindrical castings 23, 24, these castings being fixedly secured together, as by cap screws 25, and in turn fixedly secured to the partition wall 21 by cap screws 27, see FIGURES 2 and 3. The housing section 24 is formed with a semi-circular rib 30. A cap member 31 is attached to the rib 30, as by screws 32. An annular bearing supporting member 33 is clamped between the members 30, 31. This annular member 33 serves to carry a low oil pressure bearing 34 and a thrust bearing assembly 35.

An annular member 36 is mounted on the partition wall 21 and fixed thereto by cap screws 40. A second annular member 41 is fixed to the member 36 by cap screws 43, and contains a high pressure oil bearing 45. A shaft 46 is journalled in the bearings 34, 45, and has affixed to its inner end an impeller 47. The outer opposite end 48 of the shaft is connected to the compressor operating motor.

The member 36 is counterbored at 50 on the outboard side to receive a running seal structure 51. The bottom of this counterbore is defined by an inwardly extending circular flange 53, to the side of which, confronting the impeller 47, there is affixed an annular face seal 55, as by screws 56. The shaft 46 is provided with an enlargement in the form of a shoulder 57 which, when moved into engagement with the face seal 55, prevents the escape of fluid from the impeller housing into the bearing housing. The face seal is formed with a cylindrical flange 58 mounted in the flange 53. There is a seal 60 between the flange 58 and the axially movable sleeve 61 of the running seal assembly 51. Oil under pressure is supplied to the counterbore 50 by line 63 extending from pump 64. Accordingly, the running seal 51 is enveloped by oil under pressure greater than the pressure developed in the impeller housing during operation of the machine. This high pressure oil also provides lubrication for the bearing 45. The running seal assembly is of conventional structure, as basically disclosed in Patent No. 3,035,841.

The impeller shaft 46 is provided with a second enlargement 65 in the form of a collar fixedly secured to the shaft and restrained against axial movement thereon by a sleeve nut 67.

In the operation of the machine, the impeller 47 effects a thrust to the left, FIGURE 1, this thrust movement being limited by engagement of the collar 65 with the thrust bearing 35. When the speed of the shaft and impeller is reduced, as during coastdown when the circuit from the driving motor is opened, the forward thrust of the impeller decreases and eventually is overcome by the pressure within the impeller housing, causing the impeller and shaft to move to the right, FIGURE 1.

If this counter thrust movement is not restrained, the shoulder 57 on shaft 46 will engage the face seal 55. Such engagement is undesirable while the shaft is rotating, as it would result in damage to the face seal.

The outer end of the bearing support 33 is formed with a counterbore 70 to receive a cylindrical flange 71 formed on the inner surface of a cap member 73 fixed to the bearing support 33 by cap screws 74. The bottom wall of the counterbore extends radially inwardly a short distance beyond the inner edge of the flange 71 forming a shoulder 75. The counter thrust movement of the shaft is limited by a counter thrust bearing 76.

In the arrangement shown in FIGURES 1 and 4 of the drawings, the counter thrust bearing 76 is in the form of an annular member, or piston, slidably mounted in an annular recess formed in the cap 73 with its inboard movement limited by engagement with shoulder 75. The outer wall of this recess consists of the flange 71, and the inner wall of the recess is a concentrically arranged inner circular flange 77. A seal 78 is provided between the periphery of the bearing 76 and flange 71. A seal 79 is provided between the bore of the bearing and the flange 77.

High pressure oil is applied against the outer surface of the counter thrust bearing 76 by a line 80 connected to line 63 through a check valve 81. Line 80 is connected to a fitting 82 attached to cap 73, and the latter has a passageway communicating with the area behind the thrust bearing 76. As previously stated, the oil pressure in line 63 and accordingly, the oil pressure behind the thrust bearing 76, exceeds the fluid pressure within the compressor housing, maintaining the thrust bearing 76 positioned against the shoulder 75. In this position, the inner surface of the thrust bearing is positioned in running proximity to the collar 65. With this arrangement, any decrease in the impeller thrust, as during coast-down when the driving motor is disconnected from its power source, the shaft 46 can not move to the right a sufficient distance to effect engagement of the shoulder 57 with the face seal 55.

It is common practice in compressors of this type to include a time switch in the motor operating the pump 64. This switch functions to maintain power to the oil pump motor for a period of time after the circuit is opened to the main driving motor. This is to assure an adequate supply of oil to the bearings 34, 45, during coast-down of the machine. The bearing 34 is supplied from a line 85 connected to the output of pump 64 through a reducing valve 86. Line 85 communicates with passageways formed in the bearing support 33 to direct oil to the bearing 34 and the thrust bearing assembly 35. Also, the pump 64 must be in operation to establish operating oil pressure before the main drive motor can be energized. This is accomplished by the inclusion of a pressure operated switch connected in the high pressure oil line and accordingly, if the oil pressure drops to a preselected level, the circuit to the main driving motor is opened.

The check valve 81 serves to trap the high pressure oil against the outside of the thrust bearing 76 and accordingly, counter thrust movement of the impeller and shaft 46 for engagement of shoulder 57 with facing seal 55 is prevented even if the coast-down of the compressor should continue after oil pump 64 has stopped operating. A bleed off line 90 is connected to fitting 82 and includes a release valve 91 which, when opened, relieves the high pressure against the thrust bearing 76, the oil being discharged through pipe 92 to the pump reservoir 93. Valve 95 is a relief valve which functions to prevent the pressure in the low pressure line 85 from exceeding a predetermined maximum.

With this arrangement, counter thrust movement of the shaft 46 is prevented until the valve 91 is opened. This valve may be manipulated manually, but preferably is connected through a time delay switch, whereby the valve is opened automatically after a time interval sufficient to permit the impeller and shaft 46 to coast down to a standstill. When valve 91 is opened to relieve the pressure from behind the thrust bearing 76, the pressure within the impeller housing will effect counter thrust movement of the shaft 46 to effect engagement of the shoulder 57 with the face seal 55 and thereupon, the impeller housing is sealed from the bearing housing.

An additional feature of the invention involves the provision of means effective when operation of the machine is initiated to prevent rotation of the shaft and impeller until the sealing surfaces 55 and 57 have been separated. To this end, there is provided an arm 101, note FIGURE 4, secured to the piston 76 at the inboard thereof. The arm is adapted to engage switch actuating rod 102 when piston 76 is advanced to the position shown in FIGURE 4. Rod 102 in turn closes a switch 104 enabling the motor controlling rotation of shaft 46 to be energized. Upon termination of the operation of the machine and subsequent movement of piston 76, switch 104 moves to an open position preventing re-initiation of the circuit regulating the motor controlling the shaft until piston 76 again assumes the position shown in FIGURE 4.

The outboard ends of the bearing housing sections 23, 24, are closed by a cap 97 in which is mounted a labyrinth seal 98. A similar seal 99 is mounted on the inboard side of the member 36. A line 100 extends from the area between the seal 99 and the running seal 51 and serves to convey any collection of oil and refrigerant to a separator for re-circulation.

It will be apparent my invention provides many advantages over compressor structures previously used. The shut down seal functions without the necessity of additional external or auxiliary power equipment to effect its operation. Inasmuch as the thrust load is completely removed from the thrust bearings and the counter thrust bearing during shut down, an oil film is assured on these bearing surfaces before start up. The shut down seal can not be engaged while the unit is running, even if the oil pressure is lost from behind the counter thrust bearing due to the fact that the running compressor thrust load is always on the main thrust bearing assembly 35. All components of the bearings and running seal can be removed and serviced while the machine is under pressure. The counter thrust bearing is free from refrigerant atmosphere and supplied with only clean, filtered oil. It will be noted that the effective area of the counter thrust bearing 76 is substantially greater than the area of shaft 46 immediately behind the impeller 47, whereby the oil pressure in lines 63, 80, will insure prompt reposition of shaft 46 upon start up. In other words, shoulder 57 is never in running engagement with face seal 55, whereby this shut down seal remains effective for a substantially indefinite period of time.

While I have described a preferred embodiment of the invention, it is to be understood the invention is not limited thereto since it may be otherwise embodied within the scope of the following claims.

I claim:

1. A shut down seal structure for a fluid compressor consisting of an impeller housing, a bearing housing, a shaft journaled in the bearing housing and having a portion extending into said impeller housing, an impeller fixedly mounted on the extended portion of the shaft, a motor driving the shaft, said shut down seal comprising:

a fixed sealing surface encircling said shaft intermediate said housings, said shaft having fixed thereto an annular sealing surface confronting said fixed sealing surface and being maintained in axial spaced relation thereto by thrust of the impeller during operation of the compressor; a thrust bearing means fixedly mounted in said bearing housing and cooperable with said shaft to limit axial movement thereof by impeller thrust, said shaft being formed with an enlargement; a counter thrust bearing movable axially of the shaft, pressure applying means operable during rotation of said shaft to apply pressure against said counter thrust bearing to move and maintain the same in close spatial position to said enlargement to prevent sufficient counter thrust movement of said shaft for engagement of said surfaces upon reduction of impeller thrust, and pressure release means operable upon cessation of rotation of said shaft to release said pressure against said counter thrust bearing to permit counter thrust movement of said shaft sufficient for engagement of said sealing surfaces.

2. A shut down seal structure as described in claim 1 wherein said fixed sealing surface is located on a partition wall intermediate said housings.

3. A compressor shut down seal structure as described in claim 1 wherein said pressure applying means is operable to apply fluid pressure against said counter thrust bearing.

4. A compressor shut down seal structure as described in claim 1 wherein said counter thrust bearing is associated with said motor, whereby operation of said motor is responsive to a predetermined position of the counter thrust bearing.

5. A compressor structure comprising an impeller housing, a bearing housing, a partition wall between said housings, an impeller shaft extending from said impeller housing through said partition wall into said bearing housing, a bearing support detachably secured to said partition wall, a bearing for said shaft mounted in said support, a running shaft seal assembly mounted in said support and serving, during operation of the compressor, to restrain the passage of fluid from said compressor housing to said bearing, a second bearing support mounted in said bearing housing in spaced relation to said partition wall, a second bearing for said shaft mounted in said second support, a face seal fixedly mounted on said partition wall intermediate said running seal and said impeller housing, said shaft being provided with an annular enlargement confronting said face seal and being spaced therefrom by impeller thrusts during operation of the compressor, a collar fixed to said shaft, a thrust bearing mounted in said second bearing support intermediate said second bearing and said collar, a counter thrust bearing support detachably mounted on said second bearing support, a counter thrust bearing mounted in said counter thrust bearing support and encircling said shaft and being movable axially thereof, means for supplying oil under pressure against said counter thrust bearing to maintain the same in proximity to said collar to restrain counter axial movement of said shaft for the engagement of the enlargement thereon with said face seal upon reduction of impeller thrust, and valve means for relieving the pressure against said counter thrust bearing subsequent to shut down of the compressor to permit axial movement of said shaft to move said enlargement in sealing engagement with said face seal.

References Cited

UNITED STATES PATENTS 2,960,938  11/1960  Williams.
3,392,983  7/1968  Hajner _____ 277—28

ROBERT M. WALKER, Primary Examiner

U.S. Cl. X.R.

417—44; 416—174; 415—105